United States Patent [19]
Harrison

[11] Patent Number: 5,417,152
[45] Date of Patent: May 23, 1995

[54] SPEED CONTROLS

[76] Inventor: Robert G. Harrison, 2120-8th Avenue North, Suite 102, Seattle, Wash. 98109

[21] Appl. No.: 2,893

[22] Filed: Jan. 11, 1993

Related U.S. Application Data

[63] Continuation-in-part of Ser. No. 811,572, Dec. 20, 1991, Pat. No. 5,355,784.

[51] Int. Cl.$^6$ ............................................... A23N 1/00
[52] U.S. Cl. ........................................ 99/492; 99/511; 99/513
[58] Field of Search .................. 99/495, 492, 509–513, 99/456, 458, 492, 501–505, 486, 489; 241/92, 101.1, 101.2, 282.1, 282.2; 210/380.1, 360.1; 366/601, 314

[56] References Cited

U.S. PATENT DOCUMENTS

| | | | |
|---|---|---|---|
| 3,186,458 | 6/1965 | Takei et al. | 99/512 |
| 3,924,838 | 12/1975 | Waniishi et al. | 366/314 X |
| 4,183,293 | 1/1980 | Arao et al. | 99/512 |
| 4,194,697 | 3/1980 | Lemback | 241/282.1 X |
| 4,297,038 | 10/1981 | Falkenbach | 366/601 X |
| 4,681,031 | 7/1987 | Austad | 99/511 |
| 4,700,621 | 10/1987 | Elger | 99/513 X |
| 4,744,522 | 5/1988 | Borgmann et al. | 241/92 |
| 5,222,430 | 6/1993 | Wang | 99/512 |
| 5,244,275 | 9/1993 | Bauer et al. | 241/92 X |
| 5,257,575 | 11/1993 | Harrison et al. | 99/511 |

*Primary Examiner*—Timothy F. Simone

[57] ABSTRACT

Controls for the electric motors of juice extractors and other devices. The control keeps the motor at a constant speed under changing loads, and the control may allow the operator to select one of multiple operating speeds. Typically, the control will also include a safety switch which keeps the motor from being energized unless conditions consonant with safe operation of the device powered by the motor have been met.

15 Claims, 13 Drawing Sheets

| FIG. 14A | FIG. 14B |
|---|---|

SPEED CONTROLS

This application is a continuation-in-part of application No. 07/811,572 filed 20 Dec. 1991 U.S. Pat. No. 5,355,784 for JUICE EXTRACTORS.

TECHNICAL FIELD OF THE INVENTION

In one aspect, the present invention relates to speed controls for electric motors.

And, in a second aspect, the present invention relates to speed controls for electrically powered juice extractors and to juice extractors equipped with motor speed controls.

BACKGROUND OF THE INVENTION

Juice extractors commonly have a base housing a motor and controls therefor, a centrifugal type blade basket for comminuting the produce to release the juices, a filter for separating the produce into juice and pulp, a juice bowl in which the juice collects, and a lid for covering the juice bowl during operation.

Such juicers are subject to a variety of design considerations. It is generally desirable to: (a) maximize the amount of juice extracted from a given piece of produce, while (b) minimizing the amount of pulp in the juice. Operational safety is also a consideration of paramount importance.

SUMMARY OF THE INVENTION

It has now been found that these goals can be furthered by so controlling the operation of the extractor motor that the motor can be operated at a speed which remains constant as the comestible is fed into the juice extractor and the load on the juice extractor motor increases. Even greater juice extraction efficiency can be obtained by operating the motor at a higher or lower speed at which the juice extractor is capable of most effectively extracting juice from the particular comestible being processed.

These goals can be achieved by employing novel, herein disclosed circuitry which keeps the juice extractor motor speed constant as the load on the motor changes. Pushbutton-operated controls allow a particular nominal operating speed to be selected in those circumstances in which the ability to select between high and low speed operation is advantageous. The novel control systems of the present invention also have other important features such as a safety switch which keeps a juice extractor motor from being turned on unless the cover and juice bowl components of the extractor are so correctly assembled to its base as to isolate the operator from dangerous internal components of the extractor. These novel controls furthermore have the advantage that they can be so constructed as to: (a) keep the motor from starting back up if the supply of power to the motor is interrupted and then resumed, and (b) allow an operator to cycle between low and high speed operation without first shutting off the motor in those applications in which dual speed operation is provided.

Important embodiments of the invention isolate switches and other control components from the high voltage, high amperage power supply on which the controlled motor is operated. This allows components capable of only carrying small currents at low voltages to be employed. This can substantially reduce the cost of, and make it possible to miniaturize, the motor control system.

Additionally, the novel controls disclosed herein have the advantage that they can be used in other applications in which constant speed operation or such operation at different, operator-selected speeds is required or advantageous.

The objects, features, and advantages of the invention will be apparent to the reader from the foregoing and the appended claims and as the ensuing detailed description and discussion of the invention proceeds in conjunction with the accompanying drawing.

BRIEF DESCRIPTION OF THE DRAWINGS

FIG. 12 is a partial view of the FIG. 10 juice extractor, provided to show one of two latch mechanisms employed to couple the cover of the juice extractor to its base and to effect the closing of a safety interlock switch as this step is completed so that the motor of the juice extractor can then be turned on;

DETAILED DESCRIPTION OF THE INVENTION

Figure 1:
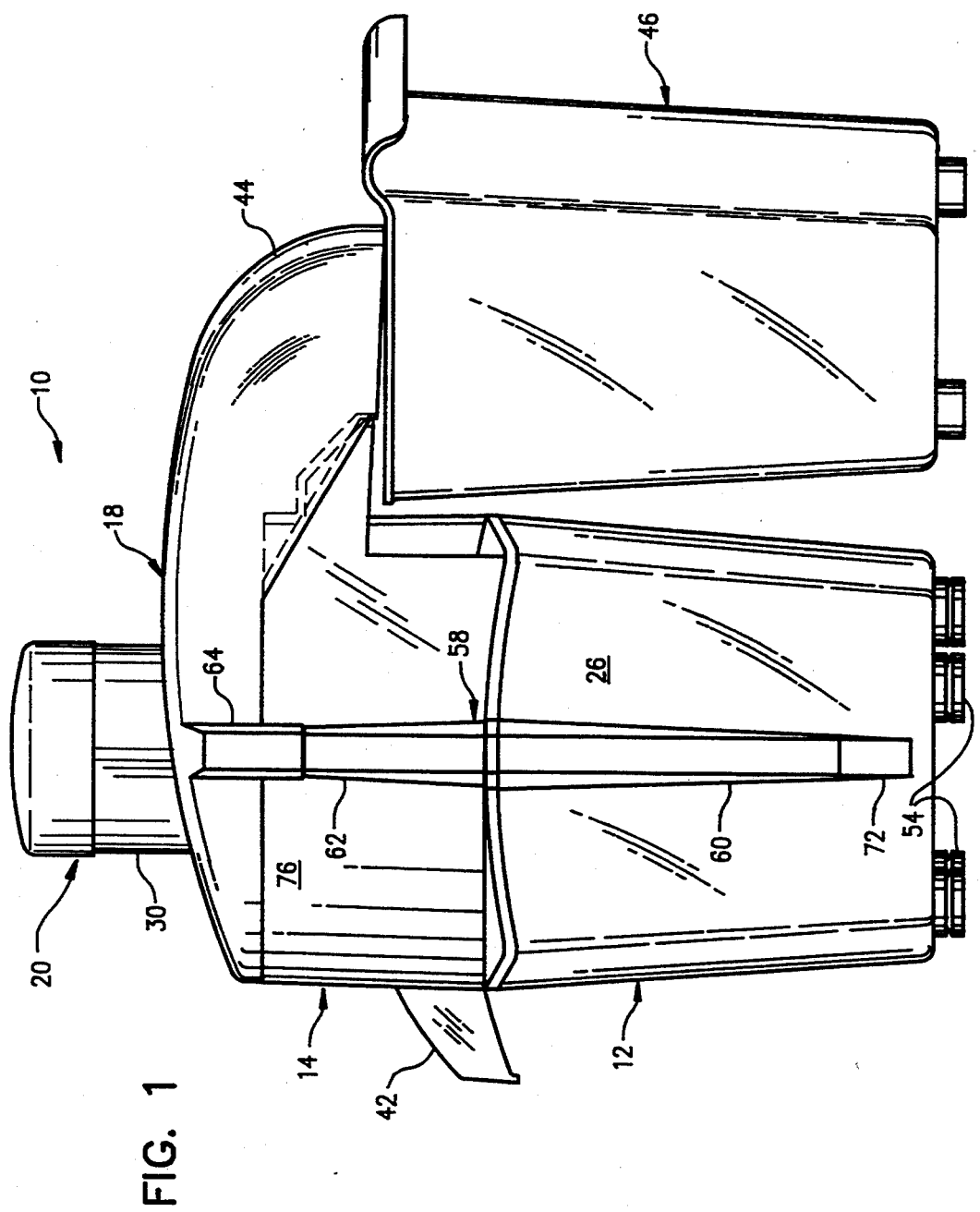
FIG. 1 is a side view of one juice extractor which may be equipped with motor controls embodying the principles of the present invention.
Figure 2:
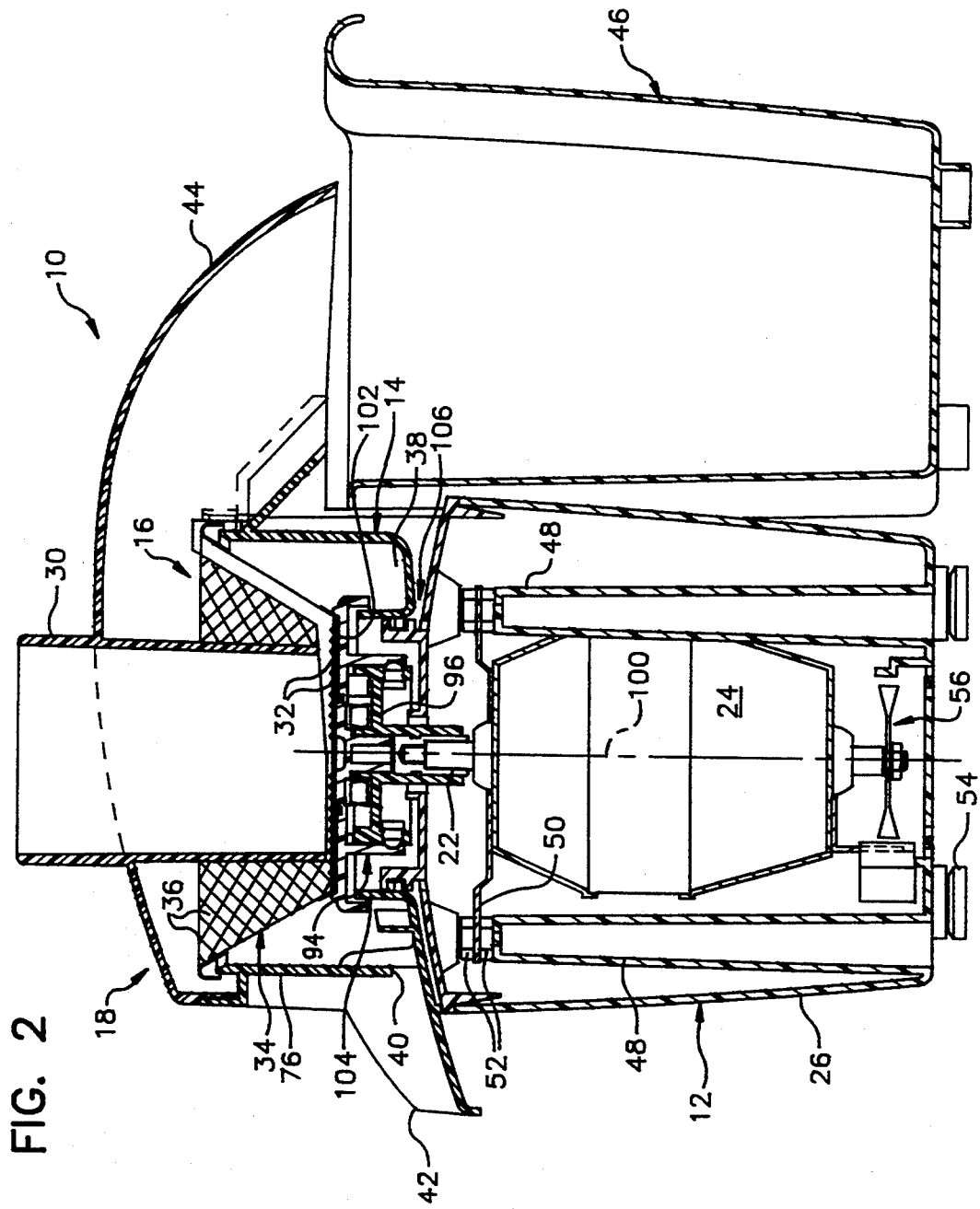
FIG. 2 is a vertical section through the juice extractor of FIG. 1.

Referring now to the drawing, FIGS. 1 and 2 depict a juice extractor 10 constructed in accord with, and embodying, the principles of the present invention. Juice extractor 10 includes the following major components: (a) a base 12; (b) a juice bowl 14; (c) a blade basket 16; (d) a juice bowl cover 18; and (e) a feed plunger 20.

Juice bowl 14 is assembled to juice extractor base 12.

Blade basket 16 is surrounded by juice bowl 14. It engages, and is rotated by, the output shaft 22 of a motor 24. The juice extractor motor is located inside the housing 26 of base 12; and its operation is governed by a control system 28, also constructed in accord with and embodying the principles of the present invention.

Juice bowl cover 18 is assembled to the juice bowl 14 to isolate the rotating blade basket 16 from the surrounding environment and to confine the comestibles being processed, the extracted juice, and the pulp to the juice bowl.

Fruits and vegetables are forced through a feed tube 30 in juice bowl cover 18 by plunger 20. Blades 32 located at the bottom of blade basket 16 and rotated by motor 24 comminute the comestibles introduced into blade basket 16 through feed tube 30.

The comminuted comestibles are pressed by centrifugal force against the inverted-frustoconical filter 34 of blade basket 16, and the juice is expressed through holes 36 in filter 34. This juice collects in a sump 38 in the bottom of juice bowl 14. From sump 38, the juice flows through a juice outlet 40 into an external spout 42. Spout 42 directs the juice to an appropriate juice container (not shown). The pulp cannot pass through filter holes 36 and is expelled by the rotation of basket 16 over the top of this basket and through a pulp chute 44 into pulp container 46.

Figure 2A:
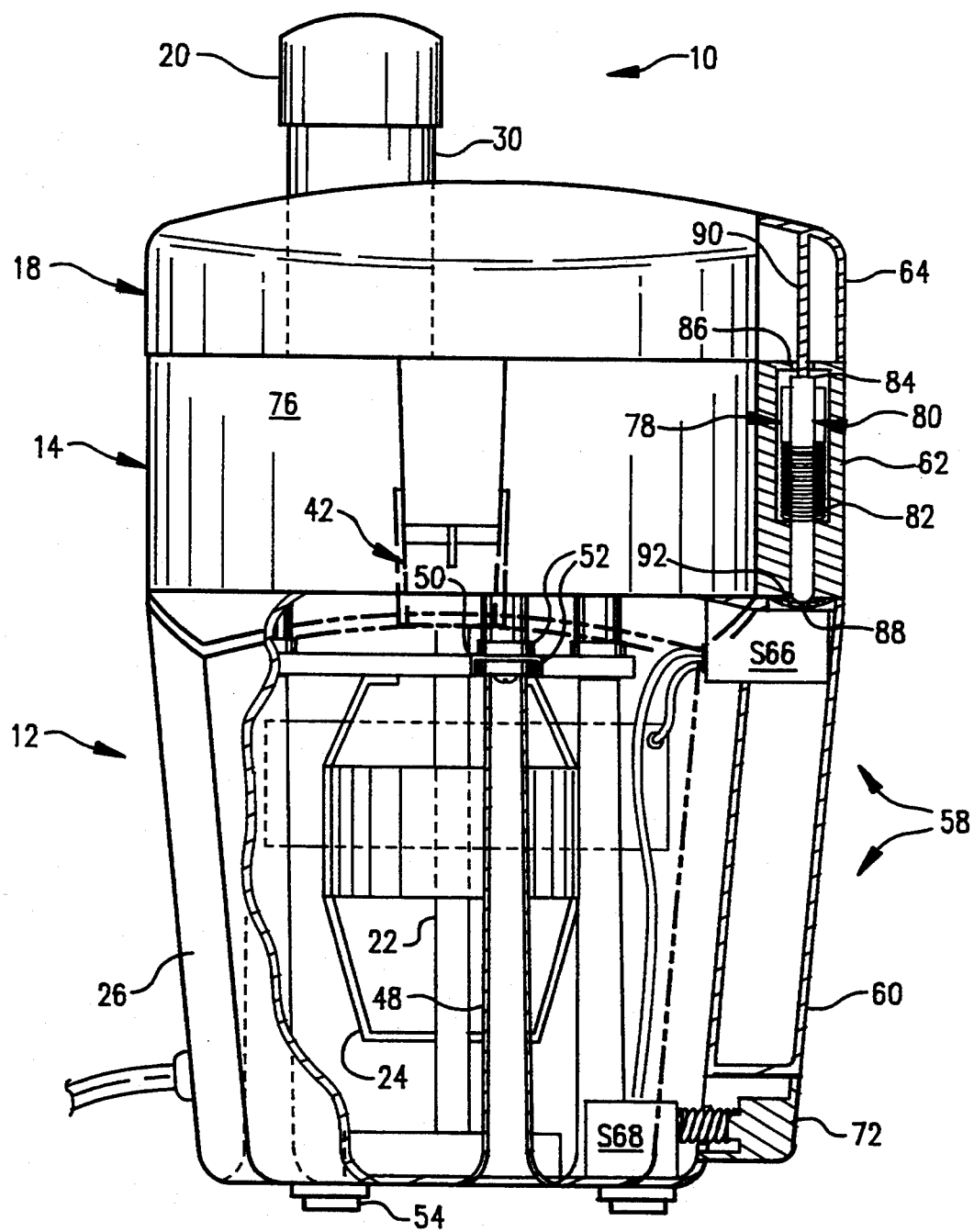
FIG. 2A is an elevation of the juice extractor with certain external components broken away to show the details of a safety interlock; this interlock keeps the extractor motor from being energized unless a juice bowl of the extractor is first locked to its base and the juice bowl cover is then locked to the juice bowl.

The motor 24 of juice extractor 10 is suspended in the housing 26 of juice extractor base 12 by three hollow legs or columnar supports 48 (see FIGS. 2 and 2A) on which integral mounting flanges 50 of motor 24 are seated. Resilient grommets 52 isolate juice extractor motor 24 from motor-supporting legs 48. They thereby absorb the vibration generated by the motor and the rotating blade basket 16 and keep this vibration from being transmitted to juice extractor base 12.

To further promote vibration-free operation of juice extractor 10, resilient feet 54 are attached to the bottom of juice extractor base 12. These feet keep vibrations from being transferred to the surface on which the juice extractor 10 is placed and also allow a large frictional force to be generated between the juice extractor and the supporting surface. The result is that feet 54 keep the juice extractor from being walked along the supporting surface by vibration generated by motor 24 and blade basket 16 and not absorbed by the vibration absorbing grommets 50 which isolate motor 24 from its columnar supports 48.

A fan 56 is mounted on the lower end of motor output shaft 22. This fan draws cooling air into the housing 26 of base 12 through holes (not shown) in the bottom of the housing.

A motor safety interlock column 58 with a base segment 60, a juice bowl segment 62, and a juice bowl cover segment 64 extends vertically along the right-hand side of juice extractor 10. The juice bowl interlock segment 62 is so mechanically related with the base and cover segments 60 and 64 that, only when all of these interlock column segments are properly aligned by locking the juice bowl to the base and the cover to the juice bowl, will the juice extractor motor 24 be allowed to operate. Accordingly, the interlock in which column 58 is incorporated prevents the user from accidentally coming into contact with the rotating blade basket 16 while juice extractor 10 is running.

A switch S66 of the safety interlock and an operator-actuated, push-type, on-off switch S68 are mounted in the housing 26 of juice extractor base 12. A manual actuator 72 for main switch S68 (shown schematically in FIG. 3) is accessible to the juice extractor operator from the exterior of base housing 26. By repeatedly depressing actuator 72, main switch S68 is alternately opened and closed to activate and deactivate motor 24.

The juice bowl segment 62 of safety interlock column 58 is located on the outer wall 76 of the juice bowl. Housed in the juice bowl interlock segment is an assembly 78 comprising a rectilinearly displaceable plunger 80 surrounded by a compression spring 82. Spring 86 biases plunger 80 to an "up" position in which its rounded upper end 84 abuts a travel limiting partition 86 in interlock segment 62 and its lower end 88 is retracted. The plunger is displaced against the bias of spring 82 by an interlock actuator cam 90 to an interlock switch-actuating "down" position. This step is effected by the locking of juice bowl cover 18 to juice bowl 14 after the bowl is locked to juice extractor base 12. When juice bowl cover 18 is removed, biasing spring 82 moves the plunger back to the up position. This results in safety interlock switch S66 opening and preventing the operation of juice extractor motor 24 under what may be unsafe operating conditions.

Feed plunger 20 (FIG. 1) is a hollow plastic component with a closed bottom (not shown). The configuration of the plunger complements the configuration of feed tube 30. Plunger 20 slides in feed tube 30 and is used to push the comestibles being processed into contact with the blades 32 of blade basket 16.

The first step in using juice extractor 10 is to assemble juice bowl 14 to juice extractor base 12. This is done by seating the juice bowl on base 12 and then rotating it to lock the juice bowl to the base. In this locked position, the juice bowl interlock segment 62 is so aligned with the base interlock segment 60 that the interlock plunger 80 is directly above, but does not contact, the actuator 92 of interlock switch S66.

The next step in the assembly process is to place blade basket 16 in juice bowl 14 and couple the blade basket hub 94 to the drive hub 96 on the upper end of motor output shaft 22. This is accomplished by aligning the blade basket 16 along the axis of rotation 100 of motor 24 and blade basket 16. The blade basket 16 is then displaced downwardly until the base 102 of blade basket 16 is just above the bottom wall 104 of juice bowl 14 and rotated as necessary to engage the drive and driven elements on the two hubs. At this point, the juice basket 16 is coupled to drive motor output shaft 22 and locked to juice extractor base 12 by a bowl-to-base locking system 106 which is described in detail in grandparent application No. 07/811,572.

Juice bowl cover 18 is then mounted on juice bowl 14. Initially, cover 18 is placed on bowl 14. Juice extractor cover 18 is then rotated until juice bowl-integrated fittings are trapped between the upper flange segments and lower flanges of complementary, juice bowl cover-associated fittings. The just-described fittings are not illustrated herein but are shown and described in detail in the '572 application to which the reader may refer, if desired.

With juice bowl cover 18 locked to bowl 14 after the bowl is locked to base 12, the juice bowl cover interlock segment 64 is aligned with the juice bowl interlock segment 62; and interlock actuator cam 90 contacts interlock plunger upper end 84, displacing the plunger downwardly against the bias of spring 82. The interlock plunger lower end 88 thereupon engages the actuator 92 of interlock switch S66, depressing the actuator and closing the interlock switch. Accordingly, locking cover 18 to juice bowl 14 allows power to be applied to juice extractor motor 24 by manually closing main switch S68 if the juice bowl has theretofore been properly locked to base 12.

Figure 3:
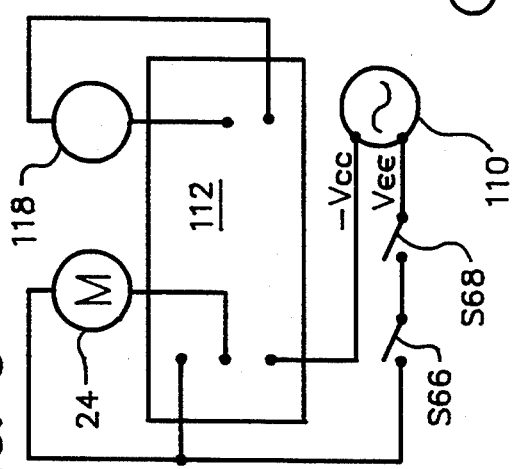
FIG. 3 is a wiring diagram for the juice extractor of FIG. 1.

Referring still to the drawing, FIG. 3 depicts in schematic form a control system 28 which, via the actuation of switches S66 and S68 and the operation of other, integral components: (1) energizes and de-energizes juice extractor motor 24, (2) causes motor 24 to operate at a constant speed as the load on juice extractor 10 changes, and (3) keeps motor 24 from being energized unless juice bowl 14 is so locked to juice extractor base 12 and cover 18 so locked to bowl 14 as to isolate the operator from the rotating blade basket 16 in juice bowl 14.

The main or on-off switch S68 and safety interlock switch S66 are wired in series. With these switches closed, juice extractor motor 24 is connected across an external, a.c. power source 110 through the speed regulating circuitry 112 shown in block diagram form in FIG. 3 and in schematic form in FIG. 4. For many comestibles, the most efficient extraction of juice can be achieved by operating motor 24 at a constant speed throughout the extraction process. It is the function of speed regulating circuitry 112 to ensure that this operating speed remains constant as comestibles reach the blades 32 at the bottom of blade basket 16, increasing the load on motor 24, and as the comminution step reaches its end, decreasing the load on the motor.

Figure 4:
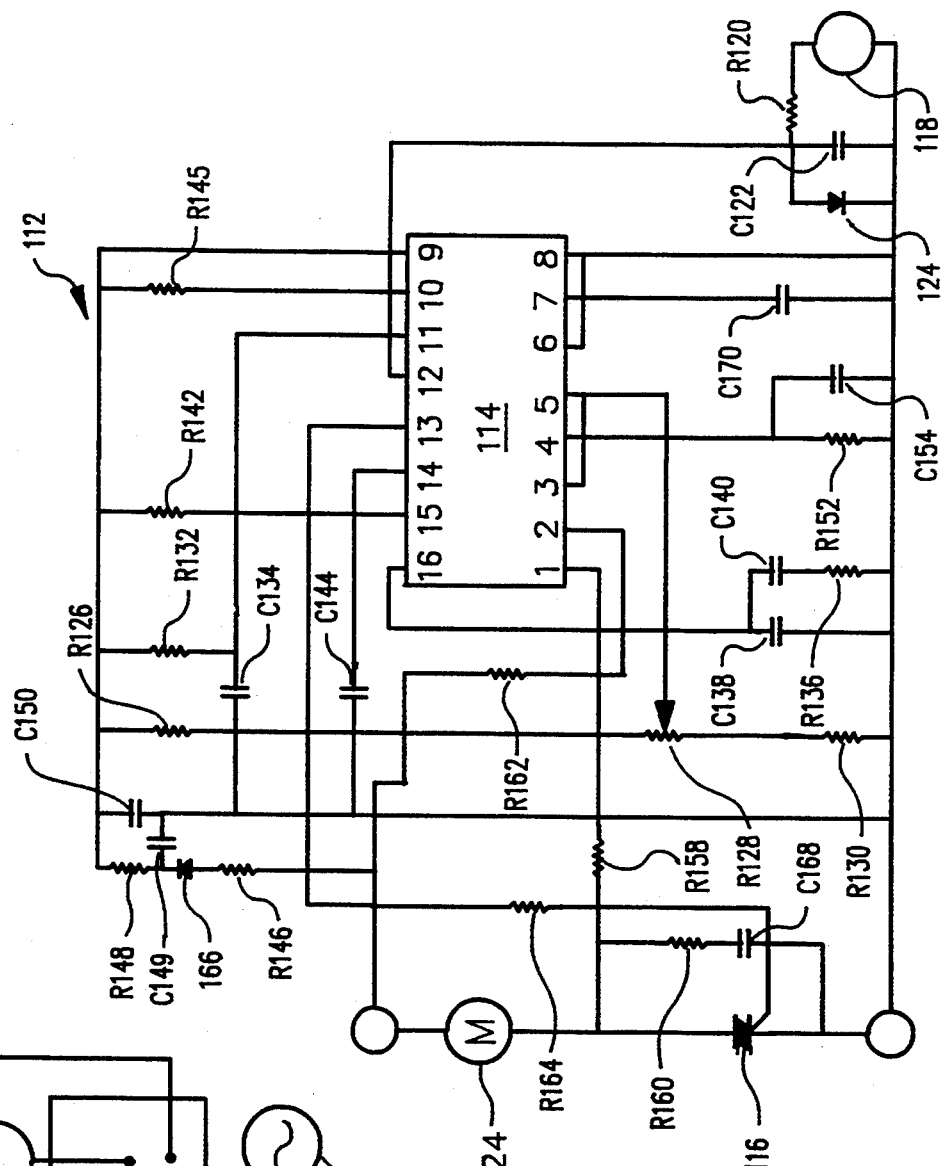
FIG. 4 is a schematic diagram of a motor control which can be incorporated in the juice extractor of FIG. 1 to keep the operating speed of the extractor constant as the load upon it changes.

Referring now to FIG. 4, motor speed control circuitry 112 includes an integrated circuit type, digital speed control 114 such as a Motorola TDA1085C. This integrated circuit regulates the speed of motor 24 by triggering a triac 116 which becomes conductive, connecting motor 24 across a.c. power source 110. Triac 116 remains conductive until the polarity across the triac reverses. By varying the point in the a.c. cycle where the triac 116 is triggered, the power available to motor 24 can be increased as the load on the motor becomes larger and decreased as load is removed, ensuring that the operating speed of the motor will remain essentially constant under the varying loads to which it is subjected in the operation of juice extractor 30.

Speed regulator 112 is of the feedback type, employing a digital signal representative of the actual speed of rotation of motor 24 to control the firing of triac 116. In the representative speed control 112 illustrated in FIG. 4, this signal is generated by a conventional magnetic pick-up 118 which is triggered by the blades of the cooling fan 56 mounted on the lower end of motor output shaft 22 as they move past the pickup. This signal is stabilized by an RC filter composed of resistor R120 and capacitor C122, rectified by a diode 124, and applied to pin 12 of integrated circuit 114.

A variety of supporting components are employed in motor control 28 to optimize the performance of speed regulator 112. These include a voltage divider circuit composed of resistors R126, R128, and R130. This circuit makes a speed reference voltage available at pins 3 and 5 of chip 114. This reference signal is compared with the sensed speed signal, making a voltage output signal for firing triac 116 available at integrated circuit pin 4.

Resistor R128 of the voltage divider network is adjustable. This adjustable resistor or potentiometer is set at the factory and determines the rpm at which motor 24 will operate.

Resistor R132 and capacitor C134 are employed to convert the detected speed signal from a digital to a voltage signal so that the "actual speed" signal can be compared with the reference signal outputted from the resistor R126 . . . 130.

The network of resistor R136 and capacitors C138 and C140 is employed to stabilize speed control 112. The values of these circuit components are determined pragmatically, keeping in mind that there is a trade-off between stability and circuit response time.

As discussed above, a current signal for firing triac 116 is made available at pin 14 of chip 114. Resistor R142 and capacitor C144 convert this current signal to one of the sawtooth type.

Resistors R145, R146, and R148 are voltage dropping resistors which are part of a smoothing circuit which also includes capacitor C149 and which supplies capacitor C150 and voltage regulator pins 9 and 10 of chip 114. The values of these three resistors are so selected as to enable them to meet the following conditions: (1) let a current of typically 1 mA flow through pin 10 of chip 114 when the a.c. line voltage is at a minimum and Vcc (see FIG. 3) is at a maximum (fast ramps and pulses present); (2) let the voltage across capacitor C150 reach a maximum of typically 3V when the external a.c. power supply 110 is providing maximum current and Vcc consumption is at a minimum (no ramps and no pulses); and (3) maintain the dynamic range at pin 10 of chip 114 over the entire power supply cycle within an envelope which will prevent loss of regulation.

A voltage representing the speed of motor 24 is discharged from pin 4 of chip 114 through resistor R152 and employed to charge a capacitor C154. The current charging this capacitor C154 is the current from pin 11 of chip 114 feeding capacitor C134 times a gain factor "G". The gain is determined by the resistance of resistor R152.

Other important components of speed control 112 are resistor R158, resistor R160, resistor R162, resistor R164, diode 166, capacitor C168, and capacitor C170.

Resistor R158 provides feedback to pin 1 of chip 114, indicating the time of firing of triac 116 and an indication of whether or not the triac latched after it was fired. Integrated circuit 114 is designed to provide repetition of the firing pulse if the triac does not latch after having been fired.

Resistor R160 and capacitor C168 protect triac 116 against problems attributable to rapid changes in voltage by outside influences. This ensures that the triac is fired only when and as intended.

Resistor R162 is a protective device for integrated circuit 114. It also allows the integrated circuit to sample the voltage applied to motor 24 as is needed to properly regulate the firing of triac 116.

Resistor R164 limits current flow between and isolates the gate of triac 116 from integrated circuit 114.

Diode 166 rectifies the a.c. voltage available from source 110. This results in d.c. power being supplied to integrated circuit 114 and the supporting components of speed control 112.

Capacitor C170 is a sink for ramp generator current provided at pin 7 of integrated circuit 114. Ramping the power to motor 24 provides a soft start with the value of capacitor C170 determining the soft-start time. Typically, this time will be relatively short so that the noticeably different sound of the motor as it ramps up to speed will not detected by the user and thought to be indicative of a defect.

The details of integrated circuit 114, how it can be employed to control the speed of motor 24, and details on supporting circuit components can be found in, inter alia, MOTOROLA LINEAR/INTERFACE DEVICES, pages 4–115 through 4–124, which is hereby incorporated in this specification by reference.

Figure 5:
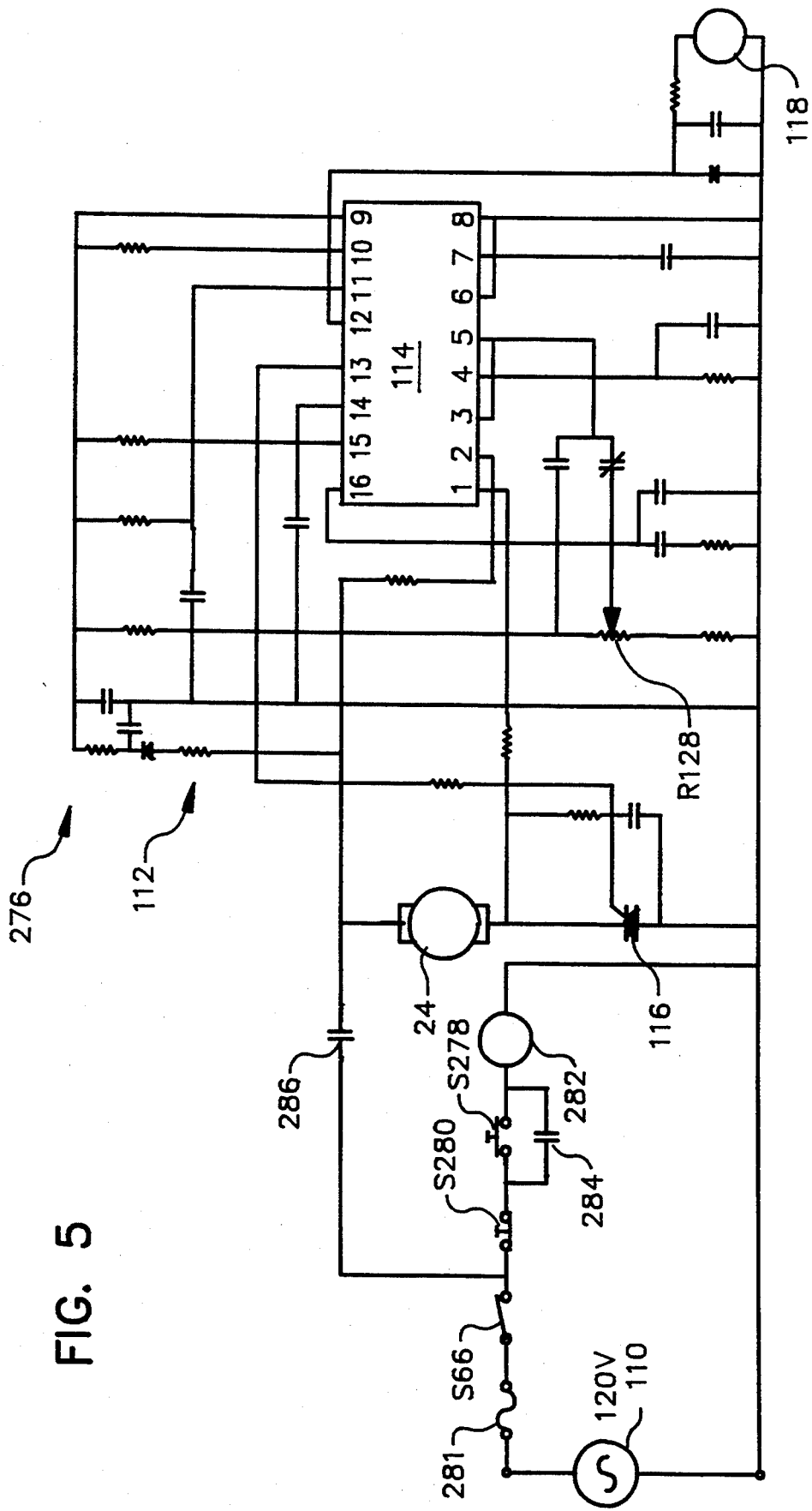
FIG. 5 is a view of a second motor control which also provides constant speed operation but has the advantage over the control shown in FIG. 4 that the control device will not automatically start up if the supply of electrical power to it is interrupted and then restored.

A juice extractor 10 with motor control 28 will start up if it is unplugged and then plugged back into an electrical outlet without first opening the main, on-off switch S68. In juice extractor and other applications of the invention in which this might pose a safety, spillage, or other problem, such resumption of operation without initiation by the laser can be avoided by employing the motor control 276 illustrated in FIG. 5. This speed control differs from the motor control 28 described above and illustrated in FIGS. 2 and 3 in that it has separate start and stop (or reset) switches S278 and S280 which are, respectively, normally open and normally closed and momentarily go to their alternate states when actuated by an operator.

With safety switch S66 closed, fuse 281 working, and reset switch S280 in its normally closed, illustrated configuration, the closing of switch S278 connects relay coil 282 across external power source 110. This results in the closing of normally open relay contacts 284 and 286. With contact 284 closed, start switch S278 is bypassed, keeping coil 282 energized when the juice extractor user releases start switch S278 which thereupon returns to its illustrated, normally open configuration. The closing of the second relay contact 286 connects juice extractor motor 24 across the external power source 110, and the motor thereafter operates in the constant speed mode described above.

The subsequent operation of off switch S280 by the user of the juice extractor opens that switch, interrupting the supply of operating current to relay coil 282; and relay contacts 284 and 286 thereupon return to the illustrated, normally open configurations. This interrupts the supply of operating power to motor 24 and readies the juice extractor for a subsequent operating cycle of the character just described, once the operator releases switch S280 and that switch returns to its normal, illustrated, closed configuration.

Juice can be most efficiently extracted from some comestibles with juice extractor 10 operating at a higher speed and from other comestibles with the extractor operating at significantly lower speed. For example, in a juice extractor of the character illustrated in FIGS. 1 and 2 and identified by reference character 10, the juice may be most efficiently extracted from soft, juicy comestibles such as citrus fruits and melons at an operating speed of about 6000 rpm whereas juice can be most efficiently extracted from other, harder fruits and vegetables such as carrots, broccoli, and greens at a significantly higher operating speed of 7000 rpm.

Figure 6:
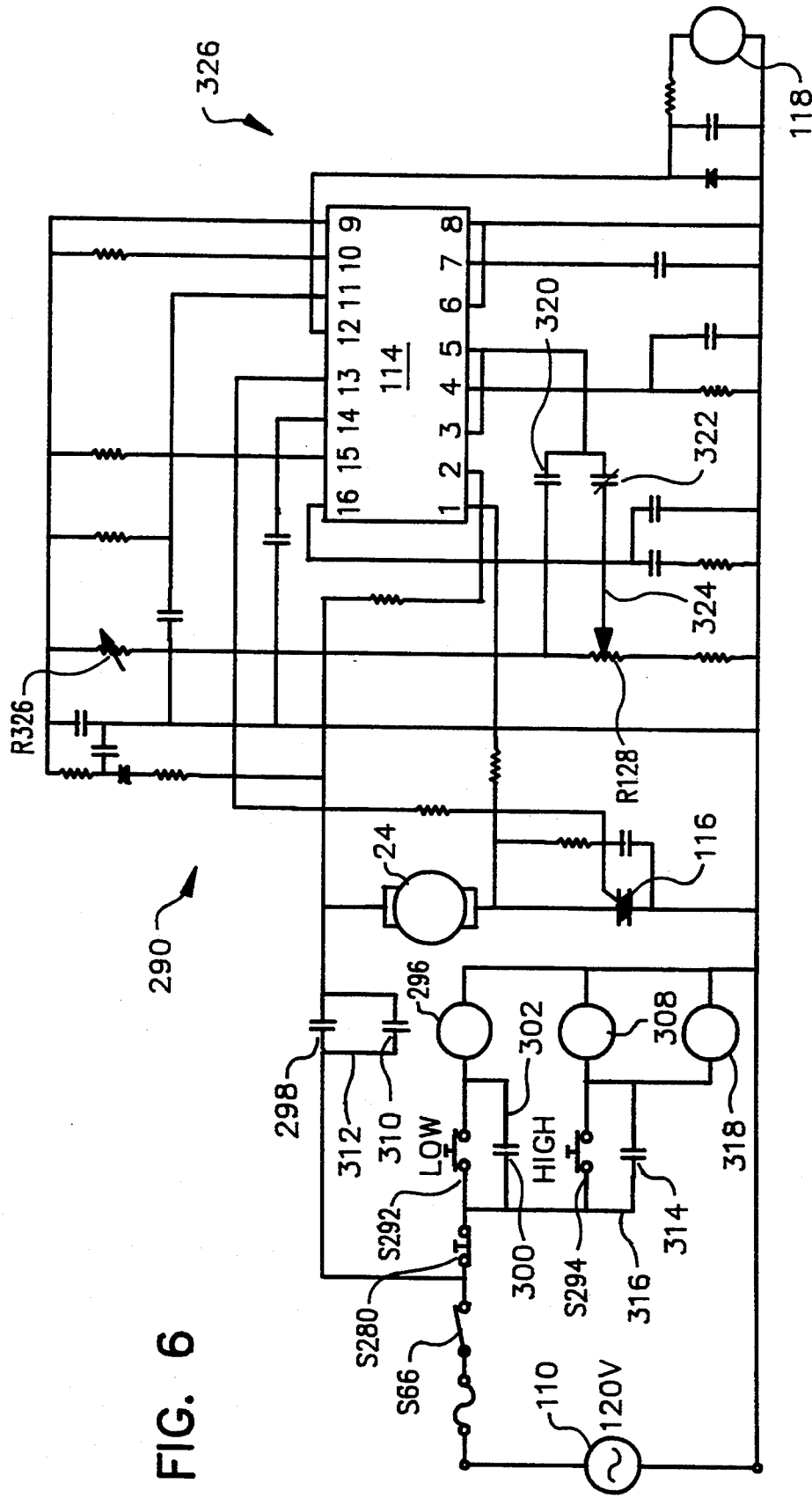
FIG. 6 is a schematic of a third motor speed control which has the advantages of the control illustrated in FIG. 5 but allows an operator to select high or low speed operation of the controlled device.

A motor control 290 which allows the juice extractor to be operated at a high or low speed best suited for efficient juicing of particular comestibles being processed and which is furthermore capable of keeping the operating speed constant at the selected high or low speed is illustrated in FIG. 6 and identified by reference character 290. Control 290 differs from the control 276 described and illustrated in FIG. 5 in that it has both a low speed on switch S292 and a high speed on switch S294 in addition to the off or reset switch S280. The operator-initiated closing of pushbutton type, biased open switch S292 will result in juice extractor motor 24 running at the lower speed whereas the alternate closing of the like character switch S294 will result in that motor running at the higher speed. Irrespective of whether motor 24 is running at a high speed or a low speed, the subsequent operator-initiated opening of the normally closed, pushbutton switch S280 will interrupt the supply of electrical power to, and turn off, motor 24.

Motor control 290 has three relays rather than the single relay of motor control 276. The first of these relays has a coil 296, a normally open contact 298 between motor 24 and electrical power source 110, and a normally open contact 300 in a lead 302 bypassing low speed on switch S292.

The second relay in motor control 290 has a coil 308, a normally open contact 310 in a lead 312 bypassing first relay contact 298, and a normally closed contact 314 in the lead 316 bypassing high speed on switch S294.

The third of the relays in control 290 has a coil 318, a normally open contact 320, and a normally closed contact 322. The normally closed contact 322 is connected between the slider 324 of adjustable resistor R128. The normally open contact 320 of this third relay is connected around potentiometer R128 between integrated circuit pin 5 and a potentiometer R326.

In motor control 290, a potentiometer R326 replaces the fixed resistor R126 of the speed regulating circuit 112 in motor control 28.

Potentiometer R128 is employed at the factory to set the "low" speed at which motor 24 will operate, and potentiometer R326 is used to set the "high" operating speed. With the coil 318 of the third relay not energized and contact 322 closed, potentiometer R128 is connected to pin 5 of integrated circuit 114, and motor 24 operates at its lower speed. If coil 318 is energized, opening contact 322 and closing contact 320, potentiometer R326 is connected to pin 5 of integrated circuit 114; and motor 24 will operate at its higher speed.

More particularly, if the low speed on switch S292 is closed by the juice extractor operator with safety switch S66 closed and reset switch S280 in its illustrated, normally closed configuration, relay coil 296 is energized, closing normally open contacts 298 and 300. This connects motor 24 across power source 110 through contact 298 and bypasses switch S292 through lead 302. The bypass keeps coil 296 energized when the operator subsequently releases switch S292 and the switch restores to its illustrated, normally open configuration.

In this low speed mode of operation, relay coil 318 is not energized. Consequently, contact 322 remains closed, connecting the voltage divider network with potentiometer R128 to integrated circuit 114; and motor 24 operates at the low speed determined by the setting of potentiometer slider 324.

If high speed operation of motor 24 is wanted instead, the operator turns off the juice extractor; closes pushbutton switch S294; and relay coil 308 is energized. This results in normally open contacts 310 and 314 being closed. Again, motor 24 is connected across the source 110 of operating voltage. However, with low speed on switch S292 in its illustrated open configuration, relay coil 296 is not energized; and contact 314 closes, bypassing high speed on switch S294. Coil 308 therefore stays energized when the operator subsequently releases high speed on switch S294 and that switch returns to the illustrated, open position.

Relay coil 318 is wired in parallel with, and thereby energized at the same time as, coil 308. Consequently, when the high speed on switch S294 is closed and coil 308 is accordingly energized, normally open relay contact 320 closes; and the associated, normally closed contact 322 opens. This interrupts the connection between potentiometer R128 and integrated circuit 114 and completes a connection between potentiometer R326 and the integrated circuit. The result is that the motor now operates at the higher speed determined by the setting of potentiometer R326.

The operator-initiated depression of push-button-operated off switch S280 opens that switch, interrupting the supply of power to previously energized relay coil 296 or relay coils 308 and 318. In the first-stated case, relay contact 298 restores to the illustrated, open configuration, interrupting the supply of electrical power to, and de-energizing, motor 24. In the second case, the motor is de-energized by relay contact 310 restoring to its illustrated, open configuration upon the de-energization of relay coil 308.

Motor control 290 has what may be a disadvantage in that the operator cannot cause juice extractor 20 to go directly from high speed operation to low speed operation. Instead, as indicated above, one must first turn off the juice extractor with switch S280 and then make the alternate speed selection.

Figure 7:
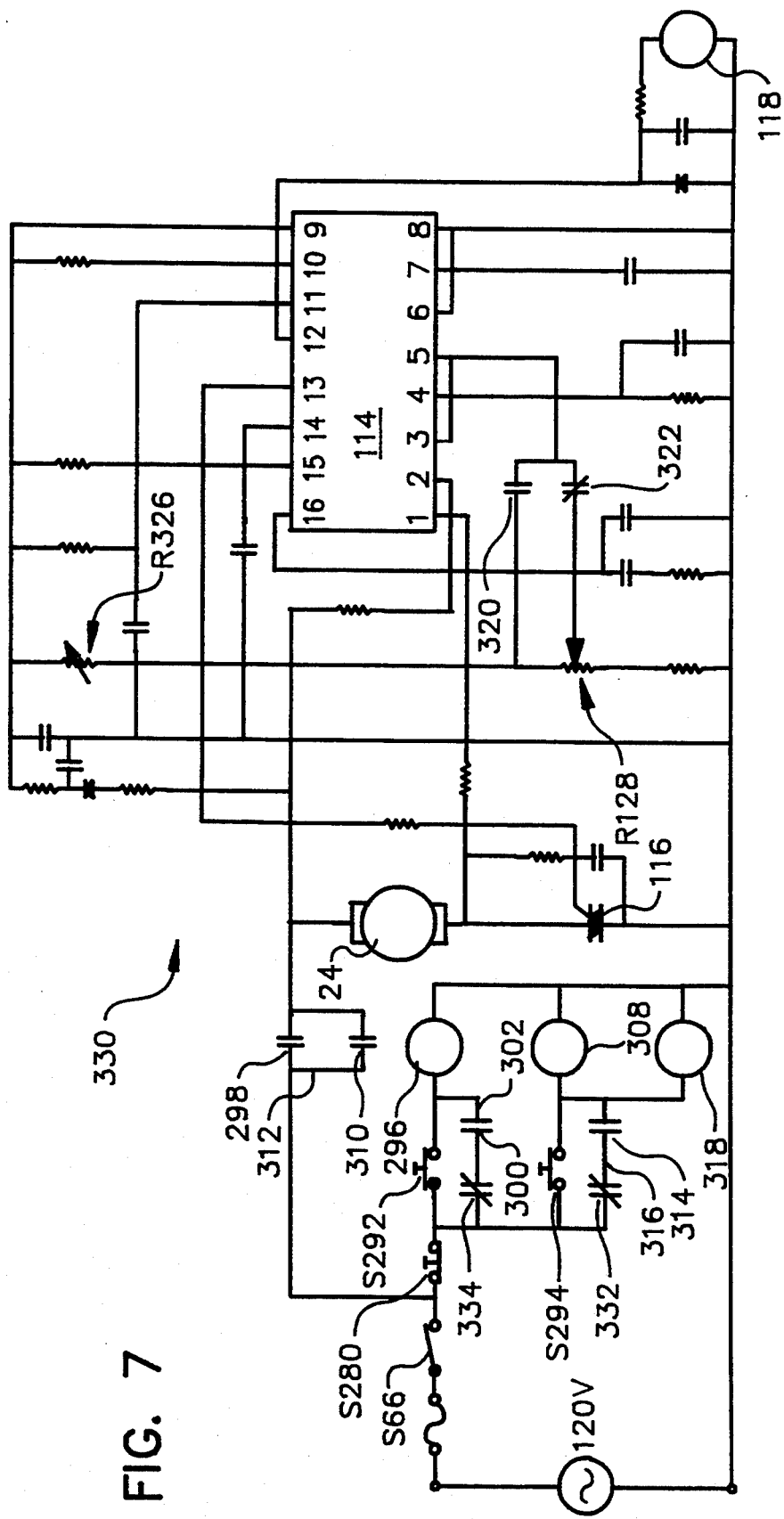
FIG. 7 is a schematic of a fourth motor speed control system embodying the principles of the present invention; this control has the advantages of the control illustrated in FIG. 6 and allows an operator to switch between high and low speed operation without first turning the controlled device off.

Another embodiment of the invention that makes this step unnecessary and allows the operator to switch back and forth between high speed and low speed operation without turning off the juice extractor is illustrated in FIG. 7 and identified by reference character 330.

Motor speed control 330 differs from speed control 290 in that the relay employed in providing low speed operation has a second, normally closed contact 332 in the lead 316 bypassing high speed on switch S294; and the relay which configures the motor control for high speed operation has a second, also normally closed contact 334 in the lead 302 bypassing low speed on switch S292. Thus, if low speed operation is selected by the operator-initiated closing of pushbutton switch S292 and high speed operation is then selected by closing high speed on switch S294, coil 308 is energized and relay contact 334 opens, interrupting the supply of power to coil 296 through bypass lead 302. With that accomplished and switch S292 open, coil 296 is de-energized; and the relay contact 332 in bypass lead 316 restores to the illustrated, closed configuration. At the same time, the coil 308 of the high speed relay is energized, the contact 314 in bypass lead 316 is closed, and power is supplied to coil 308 through the bypass lead after high speed on switch S294 is released.

The effect is complementary when motor 24 is operating at high speed and switch S292 is momentarily closed to select low speed operation. This causes contact 332 to open, de-energizing high speed relay coil 308 and allowing the relay contact 334 in bypass lead 302 to restore to the closed position. Also, low speed relay contact 300 closes so that the low speed relay coil 296 will remain energized after switch S292 is released and opens.

Figure 8:
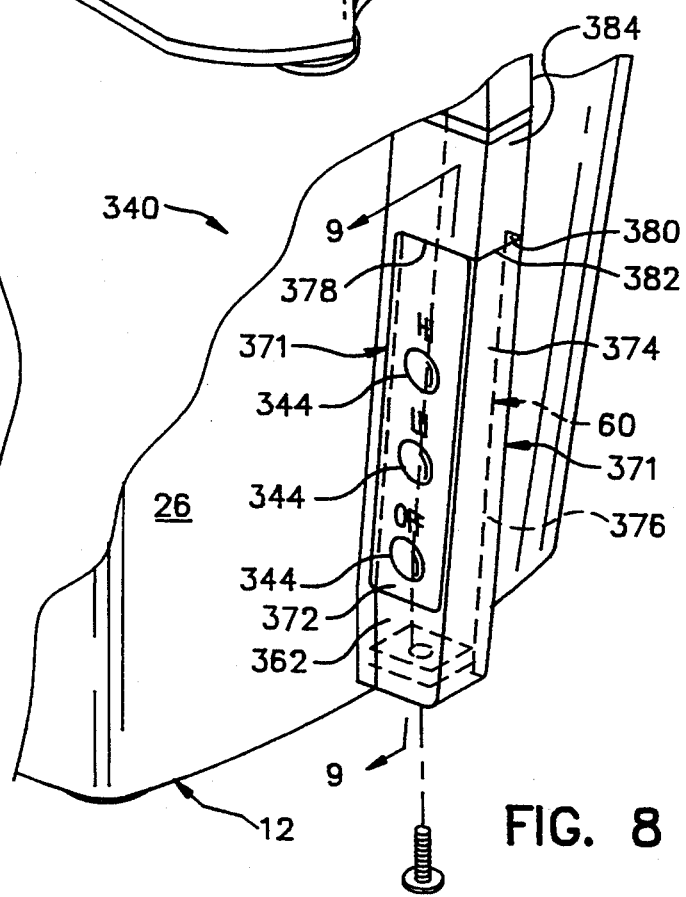
FIG. 8 is a fragmentary view of the base of the juice extractor illustrated in FIG. 1; it shows where the several pushbutton-type switches employed to control the operation of a dual speed motor control employing the principles of the present invention may be located.

Referring still to the drawing, FIG. 8 depicts in fragmentary form, a juice extractor 340 embodying the principles of the present invention which duplicates juice extractor 10 except that its base 12 has been modified to accommodate the three pushbutton-type switches S292 (low speed operation), S294 (high speed operation), and S280 (off or reset) employed in dual speed motor controls of the character described above and illustrated in FIGS. 6–8. All three of these switches are conventional. They include a casing 342 which houses the switch contacts and a spring or the equivalent for biasing the switch actuator 344 to the illustrated position with the switch contacts in the open (switches S292 and S294) and closed (switch S280) positions discussed above.

Switches S294, S292, and S280 are mounted in spaced apart, vertical alignment on a switch board 346. That juice extractor component is housed in the base interlock segment 60 of juice extractor 340 by an L-shaped switch board support 350 with a vertical retaining lip 352 and a flexible latch 354. The latch has a depending, integral keeper 356 which cooperates with support lip 352 to hold switch board 346 against vertically spaced apart, switch board positioning flanges or spacers 358 and 360. The switch board support, latch, and spacers are integrated with one side wall 362 of interlock segment 60; and they extend toward the other side wall 364 of the interlock segment. Switches S294, S292, and S280 are oriented with the actuators 344 of those three switches facing and extending through apertures 368, 369, and 370 in interlock segment side wall 364.

A flexible, transparent or translucent switch cover 371 is flush mounted to interlock 60 with the three legs 372, 374, and 376 of the cover fitted into complementary recesses 378 . . . 382 in interlock segment side walls 364 and 362 and in the front wall 384 of that segment.

cover 371 protects pushbutton switches S294, S292, and S280 from damage by impact, foreign material, etc. At the same time, it allows the operator to easily depress the switch actuators 344 as discussed above to select high or low speed operation of juice extractor 340 or to turn the motor of the juice extractor off.

Figure 10:
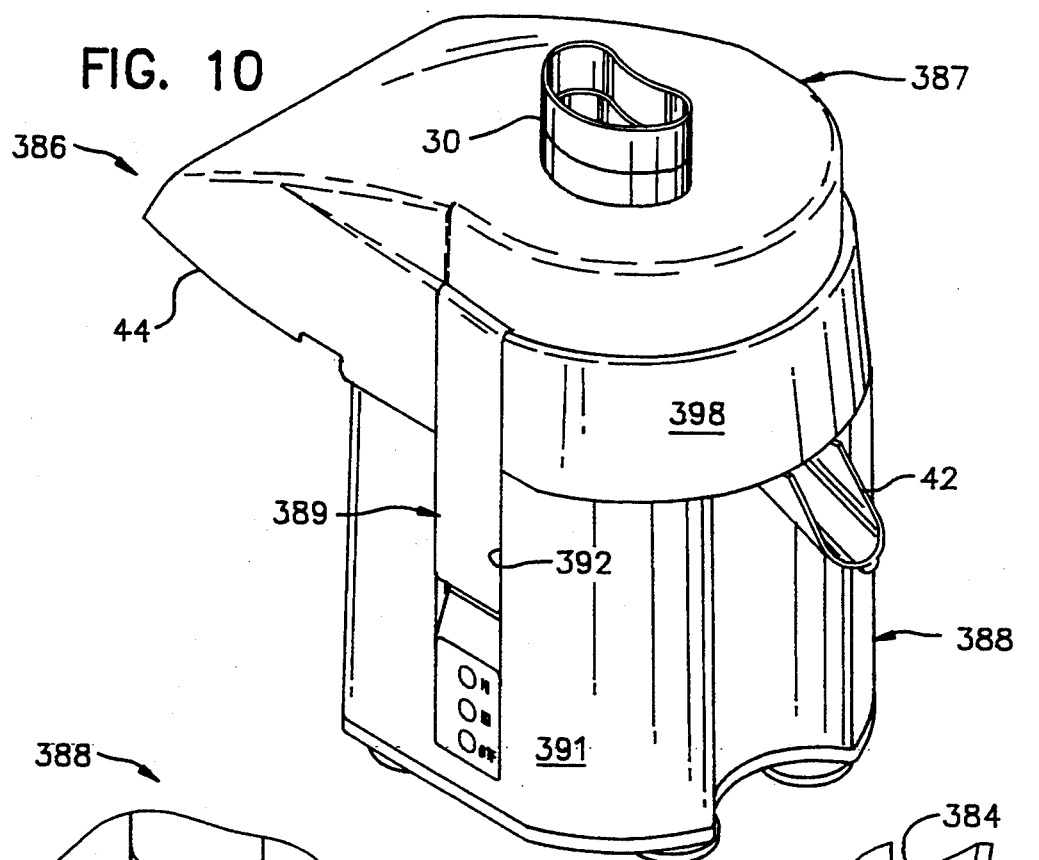
FIG. 10 is a perspective of a second juice extractor which may be advantageously equipped with motor controls embodying the principles of the present invention.
Figure 11:
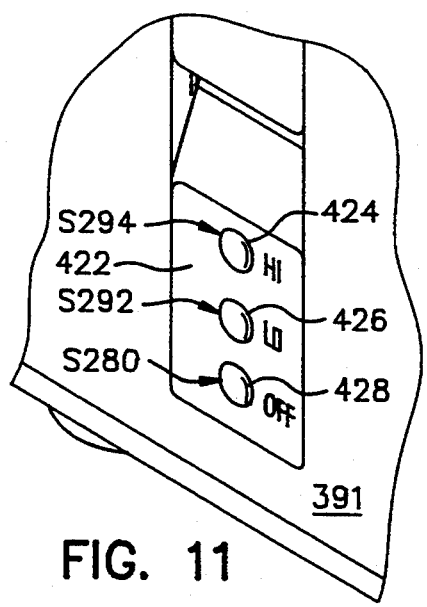
FIG. 11 is a fragmentary view of the FIG. 10 juice extractor base to an enlarged scale, showing the location of its operated-actuated control components.
Figure 12:
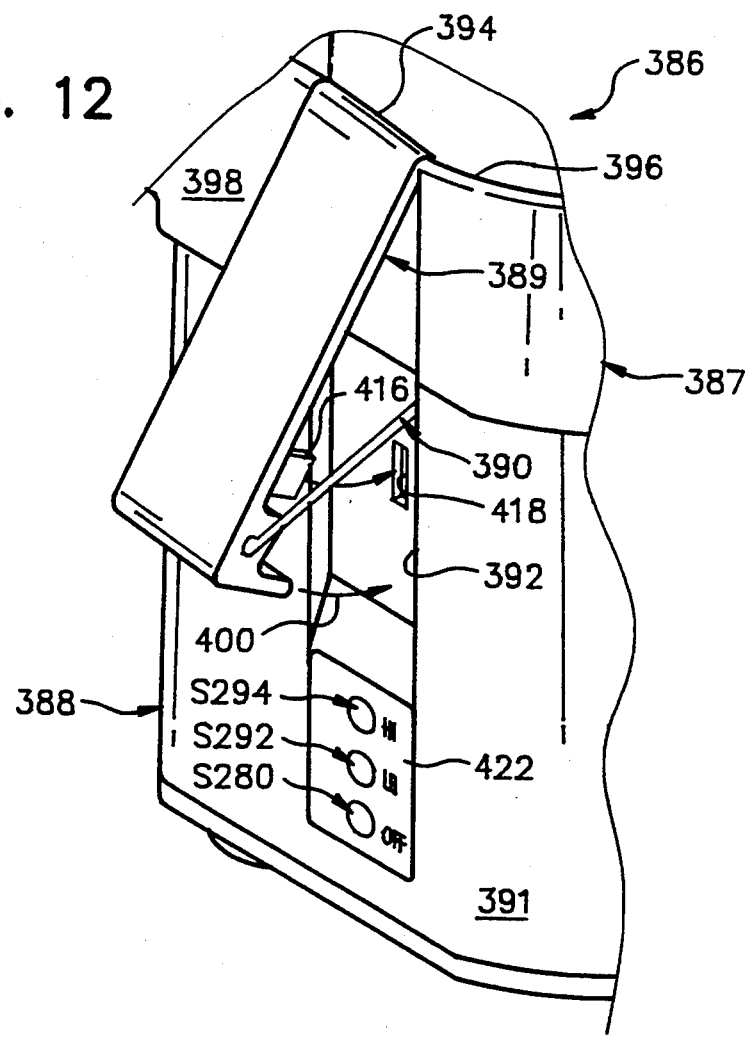

Another style of juice extractor in which motor controls providing constant speed operation or the latter end a multiplicity of nominal operating speeds can be advantageously employed is illustrated in FIGS. 10–13 and identified by reference character 386. This juice extractor differs from the juice extractor 10 described above in that its cover 387 is locked to the juice extractor base 388 in surrounding relationship to the device's juice bowl (not shown) by a pair of diametrically opposed, vertically extending latches. One of these is shown in FIGS. 10 and 12 and identified by reference character 389.

At its lower end, latch 389 is pivotably supported at the outboard end of an over center element 390. At its inboard end, this element is pivotably supported from the housing 391 of juice extractor base 388 and in a recess 392 formed in that housing.

At its upper end, latch 389 has a hook or keeper 394. This keeper fits over a lip 396 in the side wall 398 of juice extractor cover 387.

To assemble juice extractor 386, the juice bowl and knife basket are installed on base 388, and juice bowl cover 387 is then seated on the base. Next (see FIG. 12), keeper 394 is hooked over lip 396; and the lower end of latch 389 is swung in the direction indicated by arrow 400 in FIG. 12 until it moves down and then over center and snaps into place, drawing cover 387 down against and clamping it to juice extractor base 12.

This process is then repeated with the unshown latch on the opposite side of juice extractor 386 to complete the assembly process and ready the juice extractor for operation.

One of the important features of juice extractor 386 is the safety interlock employed to ensure that the juice extractor motor cannot be turned on unless the juice extractor is correctly assembled in the manner just described. Safe and spill-free operation of the juice extractor is therefore assured.

Figure 13:
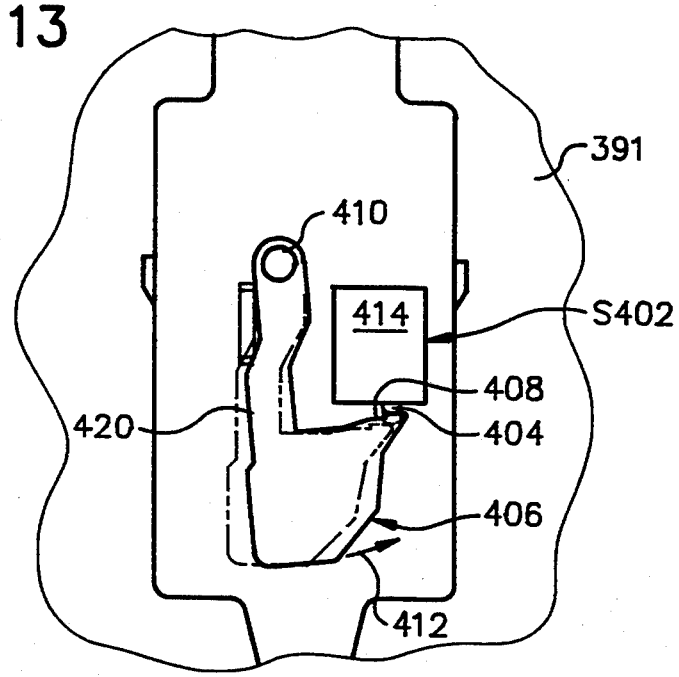
FIG. 13 is a partial, internal view of the FIG. 10 juice extractor base, showing the safety switch and a cam-type safety interlock element which is displaced by one of the latch mechanisms to close the safety switch.

As shown in FIG. 13, the safety interlock of juice extractor 386 includes a normally open safety switch S402 with a spring-loaded or otherwise biased actuator 404. Switch S402 is mounted in juice extractor base 388 behind and in line with latch 389.

An interlock element 406 with a cam surface 408 is pivotably supported in the housing 391 of juice extractor base 388, and in alignment with switch actuator 404, by a pivot pin 410. Pivoting interlock element 406 in the direction indicated by arrow 412 in FIG. 13 results in switch actuator 404 being displaced toward the switch casing 414, and that in turn results in the safety switch contacts (not shown) being closed.

Referring to FIG. 12 and also to FIG. 13, interlock element 406 is displaced in the just-described arrow 412 direction to close safety switch S402 as latch 389 completes its movement in the arrow 400 direction to lock juice extractor cover 387 to the base 389 of juice extractor. This is accomplished by a cam actuator 416 protruding from the base-facing side of latch 389 in alignment with the pivotably mounted, switch operating, cam element 408. As the lower end of latch 389 is pivoted in the arrow 400 direction to lock cover 387 to base 388, cam actuator 416 moves through a complementary opening 418 in the housing 391 of juice extractor base 388, engages the near edge 420 of cam-type interlock element 408, and then displaces that element in the arrow 412 direction to close safety switch S402 as latch 389 goes over center and snaps into place.

As indicated above, a juice extractor of the character illustrated in FIGS. 10-13 can advantageously be equipped with a motor control embodying the principles of the present invention and offering dual speed operation so that the juice extractor may be operated at a speed providing the most efficient extraction of soft juicy comestibles (low speed) and harder, typically less juicy comestibles (high speed). The high speed, low speed, and off or reset switches required for this speed selectable mode of operation can be mounted on a switch board of the character illustrated in FIG. 9 and identified by reference character 346. In a manner akin to that shown in the same figure, the switch and switch board assembly can be installed in the lower end of that safety latch-receiving recess 392 formed in the casing 391 of juice extractor base 388. A transparent or translucent covering 422 protects these switches while giving the user of juice extractor 380 easy access to the switch actuators 424, 426, and 428 respectively pressed to give operation at low and high speeds and to turn the juice extractor off.

Figures 9, 14:
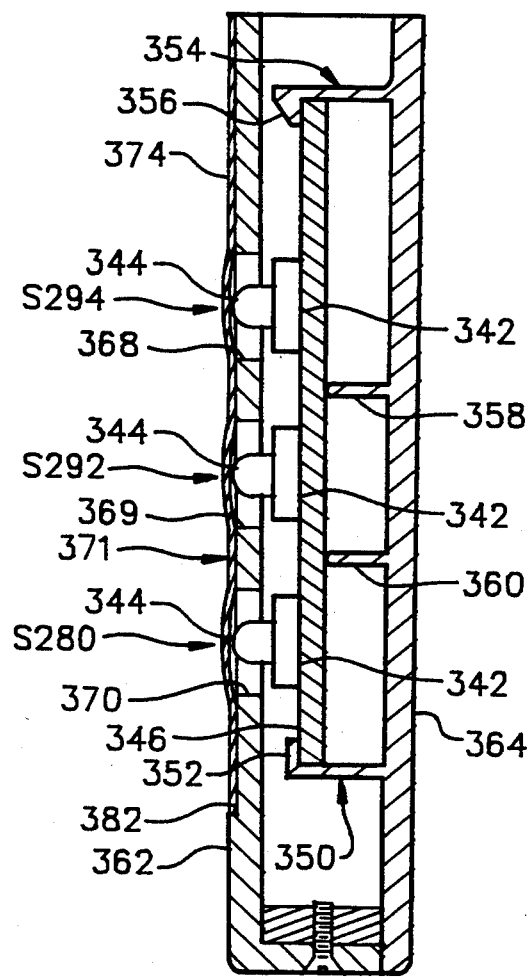
FIG. 9 is a view of the juice extractor, taken essentially along line 9—9 in FIG. 8.
FIG. 14 shows the relationship between FIGS. 14A and 14B which, taken together, constitute is a schematic of yet another motor control embodying the principles of the present invention; this control also provides for low and high speed operation of the controlled device and operation at a constant speed once high or low is selected; and the control lends itself to manufacture at low cost and to miniaturization.

If constant speed operation of its motor is wanted, and dual speed operation is not required, juice extractor 386 may be equipped with a motor control of the character illustrated in FIG. 4 and identified by reference character 112. On the other hand, if dual speed operation is wanted, a motor control as shown in any of FIGS. 5, 6, or 7 can be employed instead. Yet another motor control embodying the principles of the present invention which can be employed to advantage in juice extractor 386, as well as in juice extractor 10 and in other devices, is illustrated in FIG. 14 and identified by reference character 434.

Motor control 434 operates in a manner akin to the motor control 330 illustrated in FIG. 7 in that the juice extractor or other device in which it is incorporated may be cycled between high speed and low speed operation without turning the device off and in that the device will not automatically start back up if the supply of power to its motor is interrupted and then restored. However, control 434 does differ from control 330 in one important respect; viz., that low speed, high speed, and off switches S436, S438, and S440 are not required to carry 120V line voltage and high amperages as is the case of the switches S280, S292, and S294 of control 330. This makes control 434 significantly less expensive to manufacture than control 330. Less expensive, pushbutton-type switches can be utilized; and solid state circuit elements can be substituted for the electromechanical relays employed in control 330. This also allows the motor speed control to be miniaturized, which is obviously advantageous.

As in the other motor controls shown in the drawings and discussed above, motor control 434 connects the motor of the device in which it is incorporated (again identified by reference character 24) across an a.c. power source 110 through a triac 116; and the firing angle of the triac is adjusted by integrated speed regulator circuit 114 to keep the motor operating at a constant speed as the load on the device powered by motor changes. As in the other controls disclosed herein, integrated circuit 114 compares a motor speed feedback signal outputted from sensor 118 with a reference signal and adjusts the firing angle of triac 116 if a difference is detected. A variety of supporting components of the character described above in conjunction with motor speed control 112 are also provided in motor control 434 as shown in FIGS. 14A and 14B to ensure that the speed controlling function just described is carried out in an accurate and stable manner.

Figure 14A:
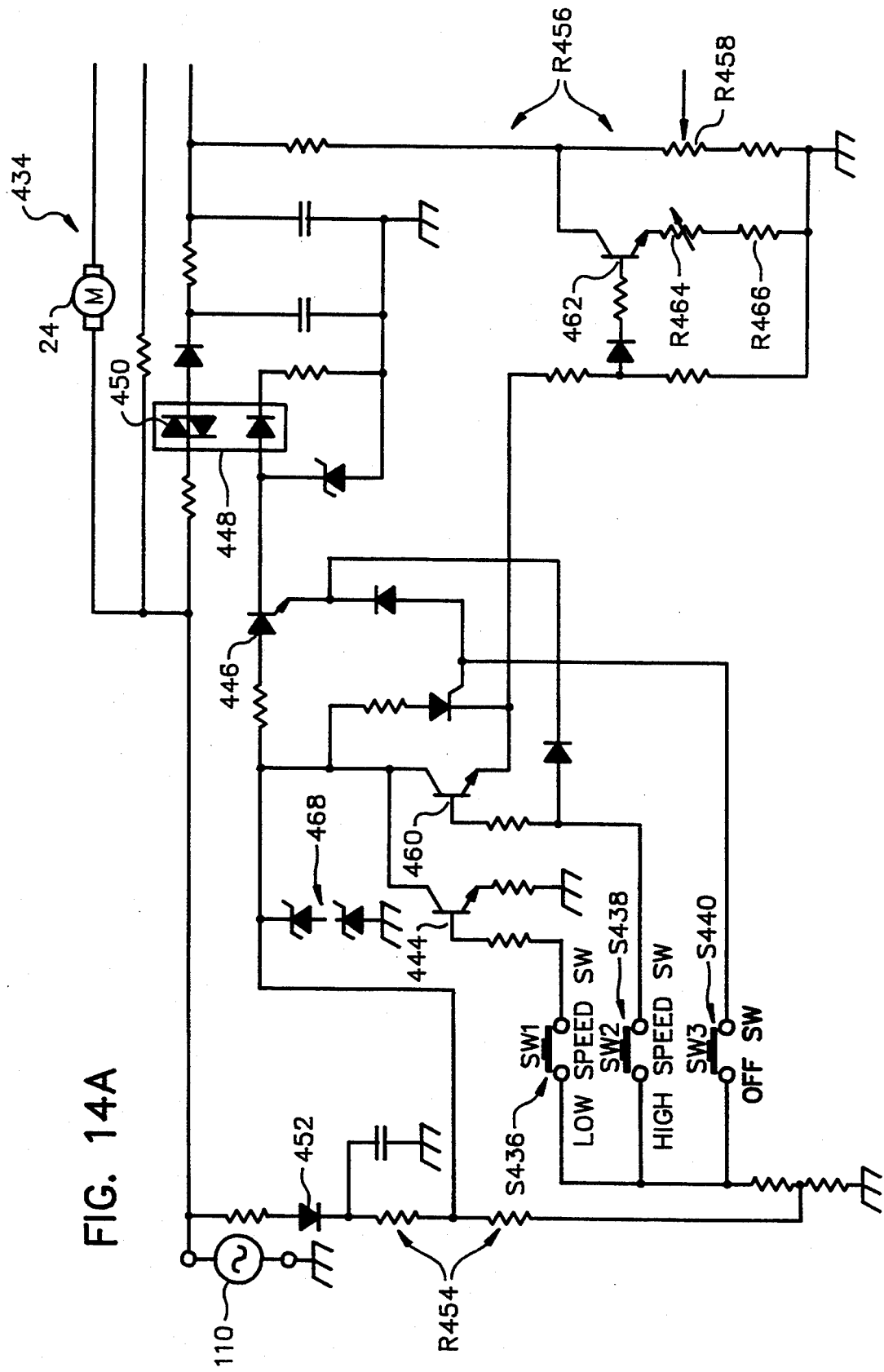
Figure 14B:
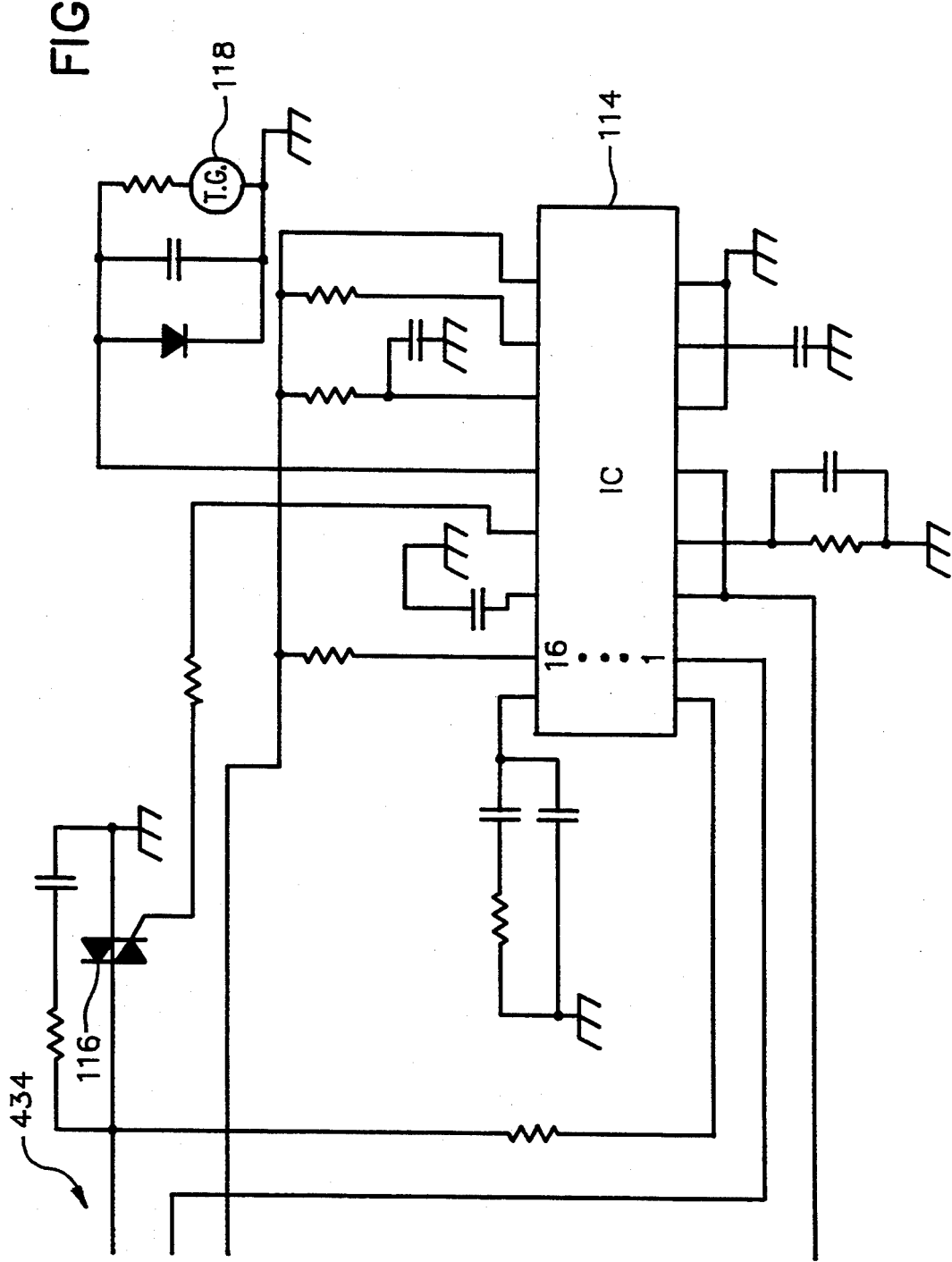

Referring then most specifically to FIG. 14A, it was pointed out that the several switches S436 . . . S440 used to select the wanted operating speed and to turn the device powered by motor 24 off do not carry large currents at high voltages, an attribute important from at least the standpoints of reduced manufacturing costs and miniaturization of the motor control.

Low speed operation of motor 24 is selected by the operation of the device in which it is incorporated by momentarily closing biased open low speed switch S436. This turns on transistor 444, firing a SCR 446 which remains conductive until it is turned off. Through an optical coupling 448, this causes a second triac 450 to be turned on, supplying rectified, low voltage power provided by diode 452 and an array of resistors indicated generally by reference character R454 to a voltage divider network R456 which includes a factory adjusted variable resistor or potentiometer R458. The output from this voltage divider network is a reference voltage for low speed operation of motor 24. The reference signal is outputted to integrated circuit 114 and there compared with the speed representative signal to provide a firing signal for triac 116.

If high speed operation of motor 24 is instead wanted, the operator of the device in which that motor is incorporated instead momentarily closes high speed switch S438. This turns on transistor 460, again causing SCR 446 to fire, turning on triac 450 and making power available to voltage divider network R456. However, transistor 460 turns a third transistor 462 on, adding factory-adjusted potentiometer R464 and fixed resistor R466 to the voltage divider network R456. The result is that the voltage divider network outputs a different reference signal, factory adjustable for a selected high speed with potentiometer R464, which results in integrated circuit 114 causing motor 24 to operate at a higher, but still constant speed.

The momentary closing of off or reset switch S440 by the operator results in voltage being applied to SCR 446 to turn off that solid state switch. This results in triac 450 also being turned off. Reference voltages are therefore no longer available to integrated circuit 114, which becomes unable to fire triac 116, power is no longer available to motor 24, and the motor accordingly turns off.

FIG. 14A also depicts a number of conventional supporting components such as the pair 468 of Zener diodes provided to protect the speed selection circuitry just described from voltage spikes. Because the supporting components are conventional and described elsewhere and function only in the customary manner, they will not be referred to further in this specification.

Figure 15:
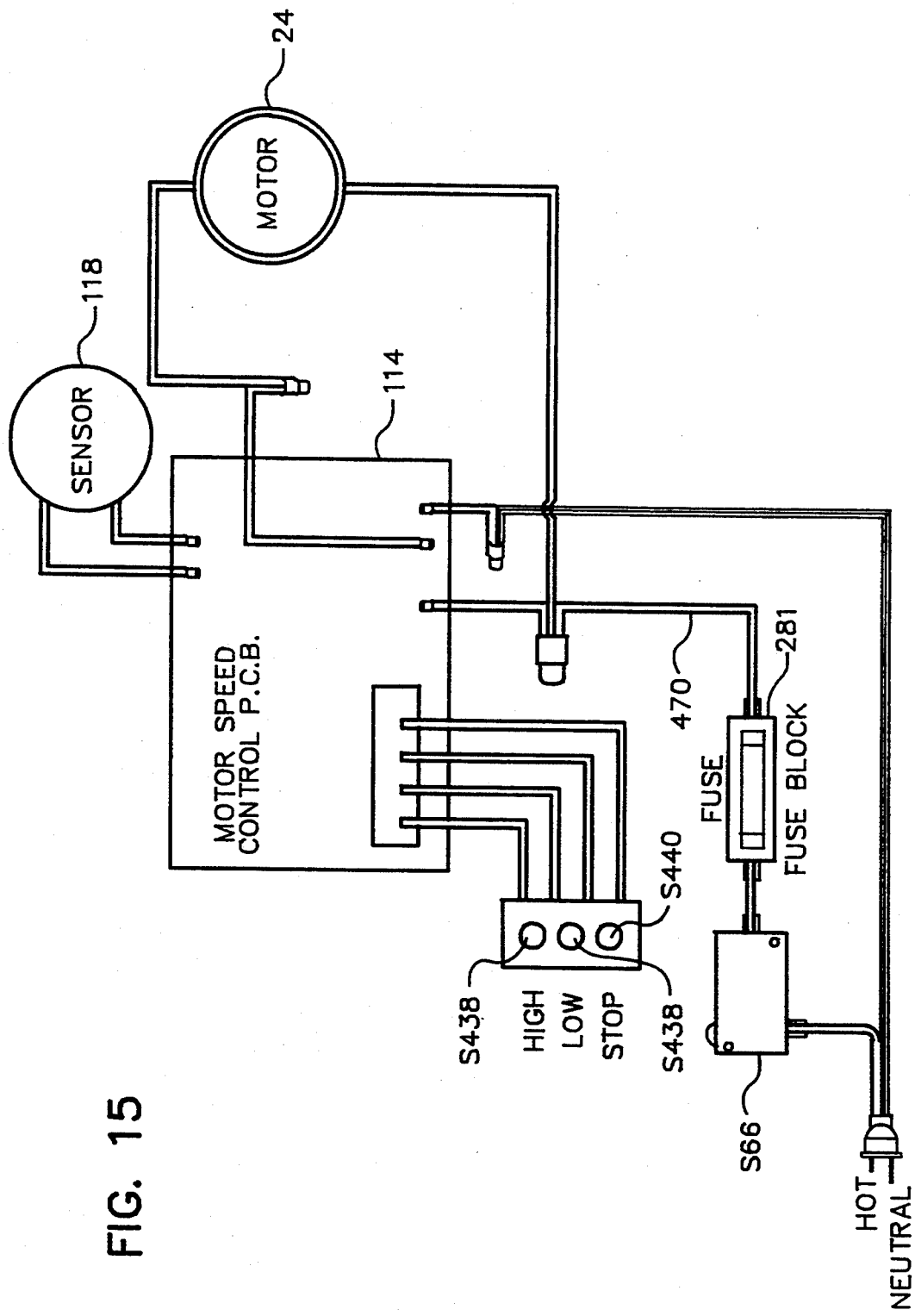
FIG. 15 is a wiring diagram for a device with an electric motor controlled with a system of the character depicted in FIG. 14.

FIG. 15 is a typical wiring diagram for a device which has an electric motor 24 and a motor control of the character depicted in FIG. 14 and identified by reference character 434. As is shown in FIG. 15 and discussed above, high speed, low speed, and stop switches S436 . . . S440 are isolated from line voltage, making possible the above-discussed reduced cost and miniaturization of the motor speed control. Also, in the arrangement shown in FIG. 15, safety switch S66 is located in the hot lead 470 from the high voltage a.c. power source. Consequently, in the illustrated arrangement, motor 24 cannot be energized unless safety switch S66 is first closed.

The invention may be embodied in many forms other than those disclosed herein without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A juice extractor comprising:
   a base which includes a motor;
   means for extracting juice from comestibles, said juice extracting means being drive-connected to said motor;
   a juice bowl for collecting extracted juice, said juice bowl being lockable to said base in surrounding relationship to the juice extracting means;
   a cover which is removably installable on the juice bowl; and
   a control means for said motor, said control means including user-activatable switch means for effecting the energization and operation of said motor at one of multiple speeds selected by a user;
   the means for selecting the motor operating speed comprising independently operable switches equalling the number of operating speeds.

2. A juice extractor as defined in claim 1 which has a further user-activatable and independent switch means for de-energizing said motor.

3. A juice extractor as defined in claim 1 which has a safety switch means that is in series with the user-activable switch means and keeps the motor from being energized unless the juice bowl is locked to the juice extractor base and the cover is assembled to the juice bowl.

4. A juice extractor comprising:
   a base which includes a motor;
   means for extracting juice from comestibles, said juice extracting means being drive-connected to said motor;
   a juice bowl for collecting extracted juice, said juice bowl being lockable to said base in surrounding relationship to the juice extracting means;
   a cover which is removably installable on the juice bowl; and
   a control means for said motor, said control means including user-activatable switch means for effecting the energization and operation of said motor at one of multiple speeds selected by a user; and
   means for maintaining the speed of said motor sufficiently constant under changing loads at the operator-selected speed to promote efficient extraction of juice from the comestibles.

5. A juice extractor comprising:
   a base which includes a motor;
   means for extracting juice from comestibles, said juice extracting means being drive-connected to said motor;
   a juice bowl for collecting extracted juice, said juice bowl being lockable to said base in surrounding relationship to the juice extracting means;
   a cover which is removably installable on the juice bowl;
   a control means for said motor, said control means including user-activatable switch means for effecting the energization and operation of said motor at one of multiple speeds selected by a user; and
   means for maintaining the speed of said motor sufficiently constant under changing loads at the operator-selected speed to promote efficient extraction of juice from the comestibles.

6. A juice extractor as defined in claim 5 in which the motor is an a.c. motor and the means for maintaining the motor speed constant comprises a switch means for controlling the flow of current to said motor; a switch operating means which regulates the speed of the motor by controlling that part of the a.c. power cycle for which operating current is made available to the motor by the switch means; means for detecting the operating speed of said motor; and means for so coupling the speed detecting means to the control means as to enable the switch means to regulate the motor speed as aforesaid.

7. A juice extractor as defined in claim 6 which has a fan rotatable by said motor, the means for detecting the operating speed of the motor comprising a magnetic sensing means activatable by the fan.

8. A juice extractor comprising:
a base which includes a motor;
means for extracting juice from comestibles, said juice extracting means being drive-connected to said motor;
a juice bowl for collecting extracted juice, said juice bowl being lockable to said base in surrounding relationship to the juice extracting means;
a cover which is removably installable on the juice bowl; and
a control means for said motor, said control means including user-activatable switch means for effecting the energization and operation of said motor at one of multiple speeds selected by a user;
said control means comprising a first circuit means providing a reference for low speed operation of said motor; a second circuit means providing a reference for high speed operation of the motor; a motor speed regulator which has means for comparing actual motor speed to an activated one of said first and second circuit means; a first means activatable by operator input to couple the first circuit means to the motor speed regulator; and a second means alternatively activatable by operator input to couple the second circuit means to the motor speed regulator.

9. A juice extractor as defined in claim 8 in which the means activatable by operator input to couple the first and second circuit means to the motor speed regulator comprises first and second relays.

10. A juice extractor as defined in claim 8 in which the means activatable by operator input to couple the first and second circuit means to the motor speed regulator comprises biased pushbutton switches.

11. A juice extractor as defined in claim 8 in which the control means includes a third circuit means for so coupling the appropriate one of the first and second circuit means to the motor speed regulator that said juice extractor can be shifted between low and high speed operation without de-energizing the juice extractor motor.

12. A juice extractor as defined in claim 11 which comprises a third relay which is activatable with one of said first and second relays, said third relay having a normally open contact between one of said first and second circuit means and the motor speed regulator and a normally closed contact between the other of said first and second circuit means and the motor speed regulator.

13. A juice extractor comprising:
a base which includes a motor;
means for extracting juice from comestibles, said juice extracting means being drive-connected to said motor;
a juice bowl for collecting extracted juice, said juice bowl being lockable to said base in surrounding relationship to the juice extracting means;
a cover which is removably installable on the juice bowl; and
a control means for said motor, said control means including user-activatable switch means for effecting the energization and operation of said motor at one of multiple speeds selected by a user;
said motor control comprising means for isolating the switch means from the high voltages and amperages of the motor power supply.

14. A juice extractor as defined in claim 13 which includes a solid state switch means for controlling the supply of operating power to the juice extractor motor and transistor-activated means for turning the solid state switch means on and off.

15. A juice extractor as defined in claim 14 which comprises motor speed regulating means, first and second circuit means for making low speed and high speed reference signals available to said speed regulating means, and two transistor activated means as aforesaid, one of said reference signal supplying circuit means being activated when one of the transistor means is turned on and the second of the reference signal supplying circuit means being activated when the second of the transistor means is turned on.

* * * * *